United States Patent [19]

Dunlap

[11] 4,139,395
[45] Feb. 13, 1979

[54] TIRE BALANCING COMPOUND

[76] Inventor: Dorsey S. Dunlap, 136 Elm St., South Williamsport, Pa. 17701

[21] Appl. No.: 694,354

[22] Filed: Jun. 9, 1976

[51] Int. Cl.$^2$ .................. B60B 13/00; C08L 89/00
[52] U.S. Cl. .................. 106/157; 152/347; 106/79; 106/80
[58] Field of Search .................. 106/33, 124, 157, 79, 106/80, 38.35; 252/72; 152/347

[56] References Cited
U.S. PATENT DOCUMENTS

| 578,551 | 3/1897 | Duryea | 152/347 |
|---|---|---|---|
| 606,751 | 7/1898 | Weintraub-Schnorr | 106/80 |
| 900,256 | 10/1908 | Batchelder | 106/80 |
| 3,987,833 | 10/1976 | Powell | 152/347 |

*Primary Examiner*—Theodore Morris
*Attorney, Agent, or Firm*—Blair, Brown & Kreten

[57] ABSTRACT

The present invention relates to a thixotropic tire balancing compound which is fed through the inflating valve stem into a tire in relatively small quantities compared to the over-all capacity of the tire. The compound partially liquifies and moves within the tire to maintain the balance of the tire at all times. As the tire wears the compound moves to maintain the balance of the tire and wheel assembly. The compound includes dextrin, albumin, glycerin and sodium silicate.

3 Claims, No Drawings

TIRE BALANCING COMPOUND

BACKGROUND OF THE INVENTION

1. FIELD OF THE INVENTION

The present invention relates to a tire balancing compound used in small quantities within the space normally reserved for air.

2. SUMMARY OF THE INVENTION

A liquid tire balancing compound is provided for use in small quantities within the air space of a tire or inner tube with the compound being used in relatively small quantities compared to the over-all capacity of the inner space. The compound moves within the tire to automatically balance the tire and wheel assembly at all times even as wear occurs. The compound partially liquifies in its use within the tire. The compound includes dextrin, albumin, glycerin, and sodium silicate.

The primary object of the invention is to provide a tire balancing compound which will maintain the tire and wheel assembly in complete balance at all times.

Other objects and advantages will become apparent in the following specification and the appended claims.

DESCRIPTION OF THE PREFERRED EMBODIMENTS

The present invention is directed to a tire balancing compound which is injected into the air space of a tubeless tire or the inner tube of a tire and wheel assembly. The quantity of material used is relatively small when considering the over-all capacity of the air space.

The compound of the instant invention includes dextrin, albumin, glycerin, and sodium silicate. The quantities of the materials used are from two percent (2%) to four percent (4%) dextrin, from five percent (5%) to seven percent (7%) albumin, from twenty-two (22%) to twenty-four percent (24%) glycerin, and from sixty-seven percent (67) to sixty-nine percent (69%) sodium silicate with these percentages being by weight. The preferred compound contains three percent (3%) dextrin, six percent (6%) albumin, twenty-three percent (23%) glycerin, and sixty-eight percent (68%) sodium silicate.

The compound described above is produced by mixing the ingredients in a suitable container and is then bottled in sizes for use. In most instances in passenger car tires two ounces of the compound are sufficient to remove all out of balance indications.

Tests of the compound were performed on three vehicles:

1966 Jeep CJ-5 — Goodyear Polyglas H70-15 tires
1972 AMC Gremlin — Goodyear Power Streak C-78-14 tires
1970 AMC Gremlin — USROYAL Safety 800-600-14 tires.

1. In each test vehicle, both front wheels were balanced on a Diametric Tire Balancer. Four ounces of lead were attached to one front wheel and two ounces of the compound according to the present invention were added. Subsequent road tests revealed no vibration or evidence of an out of balance condition. Following road testing the tires were removed and again checked on the bubble balancer. In all cases the tires remained in balance.

2. A portion of tire casing was coated with the instant compound and observed over a period of seven days. In this period there was no indication of any reaction between the balancing compound and the casing nor indication or swelling or softening.

3. The instant balancing compound is water soluble.

4. The instant tire balancing compound is non-flammable.

5. The test vehicle 1970 Gremlin was driven 10 miles with the left front tire unbalanced with four ounces of lead and right front tire in balance with two ounces of the instant compound inserted therein. The temperature of the two tires was determined using a Model 500 Digital Hand Pyrometer by Pyrometer Instrument Co., with the results as follows:

| Tire | Temperature 0 Degrees F. |
| --- | --- |
| Out of Balance | 103 |
| In Balance (instant compound added) | 92 |

The compound is effective at extreme differences in temperature and remains semi-liquid at temperatures from a minus 60° F. to a temperature of 420° F.

Having thus described the preferred embodiments of the invention it should be understood that numerous modifications and adaptations may be resorted to without departing from the spirit of the invention.

What is claimed is:

1. A thixotropic tire balancing compound for insertion in the air space of a tubeless tire or inner tube which consists of a mixture of dextrin, albumin, glycerin, and sodium silicate.

2. A compound as claimed in claim 1 wherein the dextrin is present in a quantity of two to four percent, the albumin is present in a quantity of five to seven percent, the glycerin is present in an amount of twenty-two to twenty-four percent, and the sodium silicate is present in a quantity of sixty-seven to sixty-nine percent.

3. A tire balancing compound as claimed in claim 1 including three percent dextrin, six percent albumin, twenty-three percent glycerin, and sixty-eight percent sodium silicate.